(12) United States Patent
Auer et al.

(10) Patent No.: US 9,674,742 B2
(45) Date of Patent: Jun. 6, 2017

(54) EXPLOITING ALMOST BLANK SUBFRAMES FOR INTER-CELL SCHEDULING

(71) Applicant: TELEFONAKTIEBOLAGET L M ERICSSON (PUBL), Stockholm (SE)

(72) Inventors: Gunther Auer, Stockholm (SE); Mattias Frenne, Uppsala (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/908,275

(22) PCT Filed: Jul. 30, 2013

(86) PCT No.: PCT/EP2013/065998
§ 371 (c)(1),
(2) Date: Jan. 28, 2016

(87) PCT Pub. No.: WO2015/014391
PCT Pub. Date: Feb. 5, 2015

(65) Prior Publication Data
US 2016/0183134 A1   Jun. 23, 2016

(51) Int. Cl.
H04W 36/00 (2009.01)
H04W 72/08 (2009.01)
(Continued)

(52) U.S. Cl.
CPC ... *H04W 36/0083* (2013.01); *H04W 52/0206* (2013.01); *H04W 72/0446* (2013.01); *H04W 72/082* (2013.01); *Y02B 60/50* (2013.01)

(58) Field of Classification Search
CPC ... H04W 36/30; H04W 80/04; H04M 1/7259; H04M 1/72522
(Continued)

(56) References Cited

U.S. PATENT DOCUMENTS 7,057,826 B2 * 6/2006 Cho ............... G02B 26/0825
                                                    359/676
7,495,609 B1 * 2/2009 Woo ................... G01S 19/05
                                                    342/357.64
(Continued)

FOREIGN PATENT DOCUMENTS

WO    2013045981 A1   4/2013

OTHER PUBLICATIONS

ETSI TS 136 213 V11.2.0, LTE; Evolved Universal Terrestrial Radio Access (E-UTRA); Physical layer procedures (3GPP TS 36.213 version 11.0.0 Release 11), Apr. 2013.
(Continued)

*Primary Examiner* — Danh Le

(57) ABSTRACT

A method in a cellular radio network, the method comprising, at a first basestation, synchronizing physical radio resource time-frequency radio resource units for the first basestation and a second, neighboring basestation, and determining that the first basestation intends to transmit at reduced power for, or not transmit on, one or more given time-frequency radio resource units selected from the set of available time-frequency radio resource units and determining that the second basestation intends to transmit normally on the given time-frequency radio resource unit(s). As a result of the determination, a threshold for switching of user equipment (UE) from the first to the second base station is lowered, where the UEs are to be allocated to the one or more given time-frequency radio resource units of the second basestation following switching.

17 Claims, 4 Drawing Sheets

(51) Int. Cl.
*H04W 52/02* (2009.01)
*H04W 72/04* (2009.01)

(58) Field of Classification Search
USPC .................. 455/436, 561, 550.1; 370/331
See application file for complete search history.

(56) References Cited

U.S. PATENT DOCUMENTS

| | | | | |
|---|---|---|---|---|
| 2010/0067507 A1* | 3/2010 | Park | ................ | H04J 3/0638 |
| | | | | 370/338 |
| 2010/0272066 A1* | 10/2010 | Wang | ............ | H04W 74/0833 |
| | | | | 370/331 |
| 2012/0257519 A1* | 10/2012 | Frank | ................ | H04L 5/0035 |
| | | | | 370/252 |
| 2013/0084865 A1* | 4/2013 | Agrawal | ........ | H04W 36/0083 |
| | | | | 455/436 |
| 2013/0196659 A1* | 8/2013 | Damji | ............ | H04W 52/0225 |
| | | | | 455/434 |
| 2015/0043437 A1* | 2/2015 | Chakraborty | ..... | H04W 72/082 |
| | | | | 370/329 |

OTHER PUBLICATIONS

3GPP TSG-RAN WG4 #66bis, R4-131300, DL CoMP demodulation test, Qualcomm Incorporated, Chicago, Apr. 15, 2013.
3GPP TSG-RAN WG4 RAN4 #67, R4-132494, Test cases design for CoMP demodulation performance, Samsung, Fukuoka, Japan, May 20-24, 2013.
3GPP TSG RAN WG1 Meeting #74, R1-133391, Inter-eNB signaling for semi-static CoMP operations, LG Electronics, Barcelona, Spain, Aug. 19-23, 2013.

* cited by examiner

EXPLOITING ALMOST BLANK SUBFRAMES FOR INTER-CELL SCHEDULING

This application is a 371 of International Application No. PCT/EP2013/065998, filed Jul. 30, 2013, the disclosure of which is fully incorporated herein by reference.

FIELD OF THE INVENTION

The present invention relates to inter-sector scheduling in a cellular network. More particularly, the invention relates to optimising the scheduling of user equipment when one or more sectors makes use of almost blank subframes or similar measures.

BACKGROUND

A Long Term Evolution (LTE) network makes use of orthogonal frequency-division multiplexing (ODFM) in the downlink, and DFT-spread ODFM in the uplink. A simple illustration of the LTE downlink physical resource can therefore be seen as a time-frequency grid as shown in FIG. 1. Each resource element corresponds to one OFDM subcarrier during one ODFM symbol interval. In the time domain, LTE downlink transmissions are organised into radio frames of 10 ms, each consisting of 10 subframes of 1 ms.

Resource allocation in LTE is typically described in terms of time-frequency radio resource units called resource blocks (RB) or physical resource blocks (PRB). Each resource block corresponds to one slot of 0.5 ms in the time domain, and 12 contiguous subcarriers in the frequency domain. All of the PRBs of two time-consecutive slots constitute one subframe. A pair of two time-adjacent resource blocks is known as a resource block pair. Resource blocks are numbered in the frequency domain, starting at 0 from one end of the system bandwidth.

Downlink transmissions are scheduled dynamically, with the basestation transmitting information in each subframe regarding to which terminals and on which resource blocks data is transmitted for that subframe. This control signalling is typically transmitted in the first 1 to 3 ODFM symbols in each subframe, and the number of symbols used is known as the control format indicator (CFI). The CFI is indicated by the physical CFI channel (PCHICH) transmitted in the first symbol of the control region. The control region also contains physical downlink control channels (PDCCH) and may also contain physical HARQ indication channels (PHICH) carrying ACK/NACK messages for the uplink transmission. The remaining ODFM symbols in the subframe are denoted the shared data channel region, and contain the shared data channel (PDSCH).

The downlink subframe also contains common reference symbols (CRD), which are used for coherent demodulation of (e.g.) the control information. A downlink system with CFI=3 ODFM symbols as control is shown in FIG. 3.

The PDCCH is used to carry downlink control information (DCI), for example scheduling decision and power-control commands. More particularly, the DCI comprises:

Downlink scheduling assignments, including PDSCH resource indication, transport format, hybrid-ARQ information, and control information for spatial multiplexing (where applicable). A downlink scheduling assignment also includes power control commands for the physical uplink control channel (PUCCH) used to transmit hybrid-ARQ acknowledgements in response to downlink scheduling assignments.

Uplink scheduling grants, which include information relating to PUSCH resource indication, transport formal, and hybrid-ARQ. An uplink scheduling grant also includes a command for power control of the PUSCH.

Power control commands for a group of terminals. These commands are complementary to those included in the scheduling assignments/grants.

Each PDCCH carries a single DCI message in one of the formats above. Since multiple terminals may be scheduled simultaneously (on both downlink and uplink) there must be a possibility to transmit multiple scheduling messages within each subframe. Each scheduling message is transmitted on a separate PDCCH, and consequently there are typically multiple simultaneous PDCCH transmissions within each cell. In order to support different radio-channel conditions, link adaptation can be used, in which the code rate of the PDCCH is selected to match the radio channel conditions.

Interference between cells of a mobile network can have a severe negative impact on radio performance where cells overlap. This is a particular problem in very dense networks, or in heterogeneous networks ("het nets", described below) utilising small cells (e.g. micro cells, pico cells, femto cells). The interference may be mitigated by the use of techniques such as inter-cell interference coordination (ICIC), in which physical resource blocks (PRBs) in one cell are muted in a coordinated manner, so that the signal to interference and noise ratio (SINR) is improved for users registered to adjacent cells, located near the cell border, and scheduled in those PRBs. Unfortunately, since such ICIC schemes require some of the available transmission resources of the cell to be left idle, they reduce the available bandwidth for transmission of the cell.

Heterogeneous network have recently gained large interest within the mobile cellular industry, and are regarded by many operators and vendors as necessary in order to meet high user expectation in mobile broadband applications. Heterogeneous networks can be characterised an deployments made up of a mixture of differently sized and overlapping cells. An example of such a network where pico cells are deployed within the coverage area of a macro cell is illustrated in FIG. 4. A pico cell is a much smaller basestation transmitting with low output power, and typically covers a much smaller (e.g. by a few orders of magnitude) area than a macro cell (base station).

Heterogeneous networks represent an alternative to creating denser cellular networks, and have previously been considered in cellular networks as a way of relieving traffic from the macro cells in regions of high traffic. This improves both the capacity and throughput of the macro cell, by offloading traffic from the larger cell. The throughput of users in the pico cell is also improved, as they are closer to their serving cell. This latter effect is now being exploited in mobile broadband applications, by providing low-power cells merely to improve the data rates of users in those locations, rather than for load balancing.

User equipments (UEs) making use of the cellular network constantly monitor which cell they should be associated with. This monitoring is typically conducted by evaluating the radio reception quality of the serving cell (i.e. the cell the UE is currently associated with) and comparing it to the radio reception quality of other cells. In the radio reception quality of a neighbouring cell is better than that of the serving call, the UE will establish itself on the neighbouring cell in order to ensure the best service for the user.

In LTE networks, the procedures for changing cell association depend on which of the two RRC states (RRC_IDLE and RRC_CONNECTED) the user equipment is in. When connected, the UE is known by the radio access network (RAN) and cell association decisions are taken by the RAN, generally based on mobility measurement reports by the UE. If a mobility measurement report indicates that the UE is better served by a neighbouring cell, then the network initiates a handover procedure. Mobility measurement reports contain the measured reference signal received power (RSRP) or reference signal received quality (RSRQ), both of which are measured in dB.

Depending on how the mobility measurements are used, and whether a configurable offset is included, a UE may be connected to the cell with the strongest RSRP, or the best path gain, or some combination of the two. The different cell association principles do not typically result in the same cell being selected when the base station output powers differ. This is known as link imbalance, and is illustrated in FIG. 5. For example, the output power of a pico base station is on the order of 30 dBm, while a macro basestation may have an output power of 46 dBm. As a consequence, the RSRP of the macro cell may be greater than that of the pico cell even in the vicinity of the pico cell. For downlink transmission, it is better to select a cell based on the received power, whereas for uplink transmission, it is better to select the cell with the least path loss. Therefore, it may be beneficial to connect to the pico cell even if the macro downlink is much stronger.

Increasing the coverage of small cells for operation in link imbalance zones can be done (for example) by adding a cell selection offset or bias to the RSRP measurements. However, operations with larger offsets or handover biases require ICIC across layers, particularly in highly loaded systems, to prevent signals from the pico cell from being swamped in the link imbalance zone.

In LTE Rel-10 networks, enhanced ICIC has been devised, for use with RSRP offsets of up to 6 dB. In enhanced ICIC (eICIC), the physical downlink shared channel (PDSCH) in a cell is muted or transmitted on reduced power for an entire subframe. Such almost blank subframes (ABSs) protect cell-edge users served by small, low power nodes (e.g. pico nodes) from interference from the local macro cell. However, the capacity of the macro cell is significantly degraded due to the blanking of subframes to protect the pico cell. According to Rel-11 (further enhanced ICIC), the throughput of a UE in the macro cell is reduced, as it cannot be scheduled (or must transmit at lower power) during the ABSs.

A user equipment receiving data must first detect physical layer control information broadcast by the cell in order to know which resource blocks contain the data intended for that UE, as well as other information required to demodulate the received data. The timing of the downlink data is generally not known in advance, so the UE must monitor the physical layer control transmissions in all subframes.

The principle of time-domain ICIC is illustrated in FIG. 6. In this case, a macro cell creates an ABS by avoiding scheduling data to users of the macro cell in certain subframes. This creates protected radio resources for pico cells within the macro cell. The macro cell indicates the location of the ABSs to the pico cells via the LTE backhaul X2 interface. The pico cell can then take this information into account when scheduling users operating within the link imbalance zone, prioritising these users into the protected subframes. Users operating close to the pico cell may be scheduled in all subframes, since the signal strength of the pico cell will be much greater than that of the macro cell in this region. Time domain ICIC requires that the pico cells are synchronised with the macro cell, in order to ensure that the subframes overlap properly.

In LTE Rel-10, the transmission power of the PDSCH within an ABS is strictly set to zero. This has been relaxed in LTE Rel-11, which allows for the transmit power of certain subframes to be reduced by some dB, while the CRS remains at full power. One example is reduced power subframes (RPS), which are supported by transmission mode 10 in LTE Rel-11.

Transmission mode 10 (TM10) has two main features, improved interference estimation, and the possibility for more flexible PDSCH transmission from different nodes in the network. TM10 is scheduled using DCI format 2D, which contains 2 "PQI" bits. [PQI is an abbreviation of "PDSCH to RE mapping and quasi co-location assumption indicator"]. These bits select one out of for RRC configured PDSCH to RE mapping and quasi co-location states. Each state describes how the PDSCH should be mapped to the RE in the particular schedules subframe, i.e. which RE should be excluded in the PDSCH to RE mapping within a PRB pair, such as the location of common reference signals (CRS), channel state information reference signals (CSI-RS) and from which signal in the subframe the legacy control channel mappings (PCFICH, PDCCH and PHICH) ends and the PDSCH mapping should start. Each of the RRC sets configured for the UE contains a PDSCH antenna port quasi-co-located with a CSI-RS signal. The UE may assume that the CSI-RS is being transmitted from the same node as the PDSCH, and may therefore use the CSI-RS to estimate channel properties such as Doppler shift, Doppler spread, delay spread, and average delay. This information is then used to aid in demodulating the PDSCH.

TM10 allows the UE to be dynamically scheduled from up to 4 different nodes, without the need to perform a handover. The node used for transmitting/receiving is determined for each subframe. This requires each of the nodes to be transmitting a CSI-RS signal that is orthogonal to the CSI-RS used by each of the other nodes. The different nodes may be different eNodeBs, which may have different CRS patterns, or they could be physically separate radio heads within the same eNodeB or cell. They may also be different sectors of a site. The networks configures the UE with a state for each of the CSI-RS signals. The UE then estimates the channel properties for each node from the corresponding CSI-RS signal, and uses them to demodulate the corresponding PDSCH.

When scheduling the UE on the PDSCH using DCI format 2D, the network uses the PQI bits to indicate which state the PDSCH is using to that the UE knows the correct PDSCH to RE mapping, and which channel properties should be assumed for demodulation.

In Rel-11, the enhanced control channel (EPDCCH) was introduced. The EPDCCH is similar to a PDSCH transmission, in that it is mapped as a PDSCH to the whole subframe in a set of 2, 4 or 8 PRB pairs which are configured for a specific UE. The EPDCCH contains the UE specific search space, which is used to schedule PDSCH and PUSCH transmissions to/from the UE. Two EPDCCH sets can be configured for each UE, each containing 2, 4, or 8 PRB pairs. When the UE is operating in TM10, each of the two sets is an RRC specifically configured for the UE, and associated with one of the four TM10 transmission states. This allows the network to perform dynamic node selection by associating each EPDCCH set with a node and the configured state for that node when transmitting scheduling control information to the UE. Since only two of the four possible TM10 transmission states are available, this provides less flexibility than node switching based on PDSCH.

TM10 is also used for dynamic point switching (DPS). In this use case, the network switches transmission dynamically between two or more cooperating nodes. This switching may occur as fast as the transmission time interval (TTI), which is 1 ms. When PDSCH transmission takes place from one of the selected nodes, the scheduled resources (i.e. PRB pairs) are not scheduled in the other nodes in the cooperating set of nodes. Therefore, the network can select which node to use based on the channel quality and/or traffic load in each of the nodes. In order to use DPS, a fast backhaul is required between each of the nodes and a centralised scheduler. DPS may also be used in combination with EPDCCH switching for two nodes, as discussed above.

As can be seen from the above description, interference coordination causes a loss in network capacity, as some resources on the macro node must be left idle to reduce interference on the pico node. In particular, the use of ABS or RBS forces the macro BS not to transmit (or to transmit at reduced power) for entire subframes, which reduces the overall capacity of the macro node. It is therefore desirable that macro cells making use of ABS and RPS can be exploited as efficiently as possible by the radio network.

SUMMARY

It is an object of the invention to mitigate the impact of picocells on the overall network capacity. This is achieved by taking into account the effect of a picocell when making inter-cell switching decisions.

According to a first aspect of the present invention there is provided a method in a cellular radio network, the method comprising, at a first basestation ($BS_1$), synchronising physical radio resource time-frequency radio resource units for the first basestation ($BS_1$) and a second, neighbouring basestation ($BS_2$), and determining that the first basestation ($BS_1$) intends to transmit at reduced power for, or not transmit on, one or more given time-frequency radio resource units selected from the set of available time-frequency radio resource units and determining that the second basestation ($BS_2$) intends to transmit normally on the given time-frequency radio resource unit(s). As a result of the determination, a threshold for switching of user equipment (UE) from the first to the second base station is lowered, where the UEs are to be allocated to the one or more given time-frequency radio resource units of the second basestation ($BS_2$) following switching.

Embodiments of the invention encourage UEs to switch to a new cell "earlier" than normal, to release capacity in their current cell which is limited due to non-use of certain sub-frames.

The method may further comprise, at the first basestation ($BS_1$), sending a first notification that the first basestation ($BS_1$) intends to transmit at reduced power for, or not transmit on, the given time-frequency radio resource unit(s) selected from the set of available time-frequency radio resource units. A second notification is received that the second basestation ($BS_2$) intends to transmit at reduced power for, or not transmit on, one or more further given time-frequency radio resource units selected from the set of available time-frequency radio resource units. The step of determining that the second basestation ($BS_2$) is transmitting normally on the given time-frequency radio resource unit(s) comprises receiving the second notification.

Switching UEs from the first to the second basestation may comprise transmitting a shared data channel PDSCH from the second basestation to the UEs, and does not comprise transmitting either a physical downlink control channel, PDCCH, or an enhanced control channel, EPDCCH, from the second basestation to the UEs. Alternatively, switching UEs from the first to the second basestation comprises handing over the UEs from the first to the second basestations. In a still further alternative, the UEs are to be additionally allocated to time-frequency radio resource units of the first basestation other than the given time-frequency radio resource unit(s).

The allocation may be performed using LTE transmission mode 10, TM10.

According to a second aspect of the present invention there is provided an apparatus configured to operate as a first basestation ($BS_1$) for use in a cellular network, the apparatus comprising a transceiver for communicating with user equipments within a coverage area, and a synchronisation unit configured to synchronise the physical radio resource time-frequency radio resource units provided by the first basestation ($BS_1$) with those provided by a second, neighbouring basestation ($BS_2$). The apparatus comprises an interference coordination unit configured to determine that the first basestation ($BS_1$) intends to transmit at reduced power for, or not transmit on, one or more given time-frequency radio resource units selected from the set of available time-frequency radio resource units and to determine that the second basestation ($BS_2$) intends to transmit normally on the given time-frequency radio resource unit(s). The apparatus further comprises a switching unit configured to, as a result of the determination, lower a threshold for switching of user equipment, UEs, from the first to the second base station where the UEs are to be allocated to the one or more given time-frequency radio resource units of the second basestation ($BS_2$) following switching.

The apparatus may comprise a backend communication unit configured to send a first notification that the first basestation ($BS_1$) intends to transmit at reduced power for, or not transmit on, the given time-frequency radio resource unit(s) selected from the set of available time-frequency radio resource units and to receive a second notification that the second basestation ($BS_2$) intends to transmit at reduced power for, or not transmit on, one or more further given time-frequency radio resource units selected from the set of available time-frequency radio resource units. The interference coordination unit then determines that the second basestation intends to transmit normally on the given time-frequency radio resource unit(s) using the second notification.

The switching unit may be additionally configured to, following switching of the UEs, allocate the UEs to time-frequency radio resource units of the first basestation other than the given time-frequency radio resource unit(s). The switching unit may be configured to perform the allocation using LTE transmission mode 10, TM10.

According to a third aspect of the present invention there is provided a method in a cellular radio network, the method comprising synchronising physical radio resource time-frequency radio resource units for first ($BS_1$) and second ($BS_2$) neighbouring basestations (S201) and, at the first basestation ($BS_1$), transmitting at reduced power or not transmitting on one or more time-frequency radio resource units selected from a set of available time-frequency radio resource units (S202). At the second basestation ($BS_2$), normally transmission is made on one or more time-frequency radio resource units selected from a set of available time-frequency radio resource units. A threshold for switching of user equipment, UEs, from the first to the second basestation is lowered, where, following switching, the UEs are to be allocated to time-frequency radio resource units on which the first basestation transmits at reduced power or does not transmit, and on which the second basestation transmits normally (S203).

At the first basestation, a notification may be sent to the second basestation that the first basestation ($BS_1$) intends to transmit at reduced power for, or not transmit on, the given time-frequency radio resource unit(s) selected from the set of available time-frequency radio resource units. A notification is received from the second basestation that the second basestation intends to transmit at reduced power for, or not transmit on, one or more further given time-frequency radio resource units selected from the set of available time-frequency radio resource units.

Switching UEs from the first to the second basestation may comprise transmitting a shared data channel PDSCH from the second basestation to the UEs, and does not comprise transmitting either a physical downlink control channel, PDCCH, or an enhanced control channel, EPDCCH, from the second basestation to the UEs. Alternatively, switching UEs from the first to the second basestation comprises handing over the UEs from the first to the second basestations. In a still further alternative, the UEs are to be additionally allocated to time-frequency radio resource units of the first basestation other than the given time-frequency radio resource unit(s).

The allocation may be performed using LTE transmission mode 10, TM10.

According to a fourth aspect of the present invention there is provided a computer program comprising computer readable code which, when run on an apparatus, causes the apparatus to behave as an apparatus according to the above second aspect of the invention.

According to a fifth aspect of the present invention there is provided a computer program product comprising a non-transitory computer readable medium and a computer program according to the above fourth aspect of the invention, wherein the computer program is stored on the non-transitory computer readable medium.

DETAILED DESCRIPTION

As described previously, the muting of transmission resources (e.g. when using ABS or RPS) is used to protect cell-edge UEs connected to small cells within a heterogeneous network. However, the use of such muting also reduces interference to adjacent macro cells. The present invention seeks to take advantage of this by switching the PDSCH, EPDCCH, or both, of UEs at the macro cell border to a neighbouring macro cell when ABS/RPS is used in the macro cell that would otherwise be selected (hereafter the "home" macro cell). This switching is coordinated with the muting of transmission resources in the home cell, and therefore the interference between the cells in greatly reduced. Since the UE may now receive from the neighbouring cell without interference from the home cell, the signal quality may in fact be improved from normal transmission, where the UE would receive from the home cell, but with interference from the neighbouring cell.

The remainder of the description will be presented with reference to a heterogeneous network, where cell edge UEs connected to small cells are protected from macro cell interference by the use of ABS in the macro cell. The skilled person will appreciate that the invention is equally applicable to other forms of ICIC, particularly the use of RBS, but also other time-domain ICIC or frequency domain ICIC (e.g. muting individual PRBs).

Figure 1:
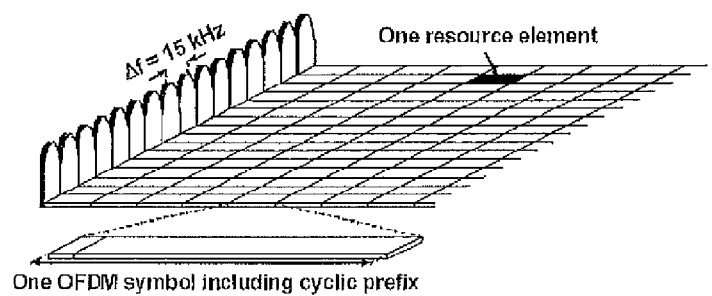
FIG. 1 is an illustration of the time and frequency domain structure of the LTE downlink physical resource.
Figure 2:
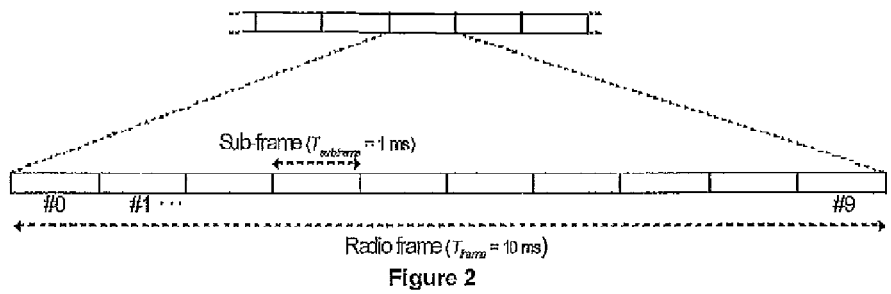
FIG. 2 is an illustration of the time domain structure of the LTE downlink.
Figure 3:
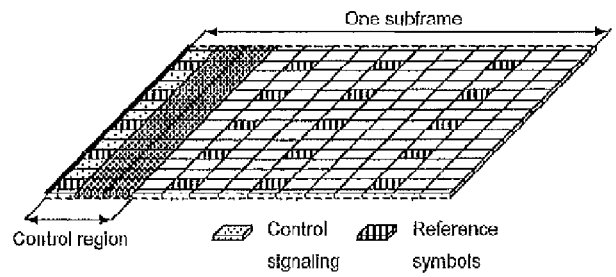
FIG. 3 is an illustration of the structure of an LTE downlink subframe.
Figure 4:
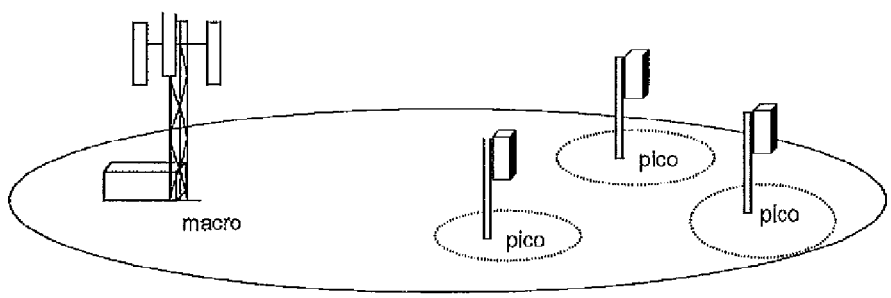
FIG. 4 is an illustration of a heterogeneous network.
Figure 5:
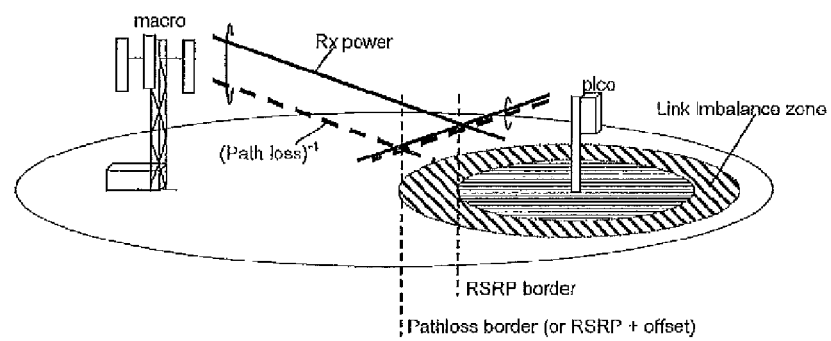
FIG. 5 illustrates the cell association criteria between a macro cell and a pico cell.
Figure 6:
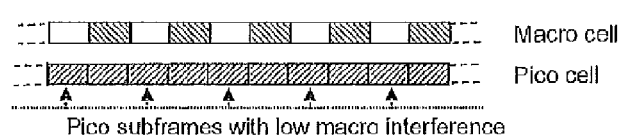
FIG. 6 illustrates the use of Almost Blank Subframes to reduce pico cell interference.
Figure 7:
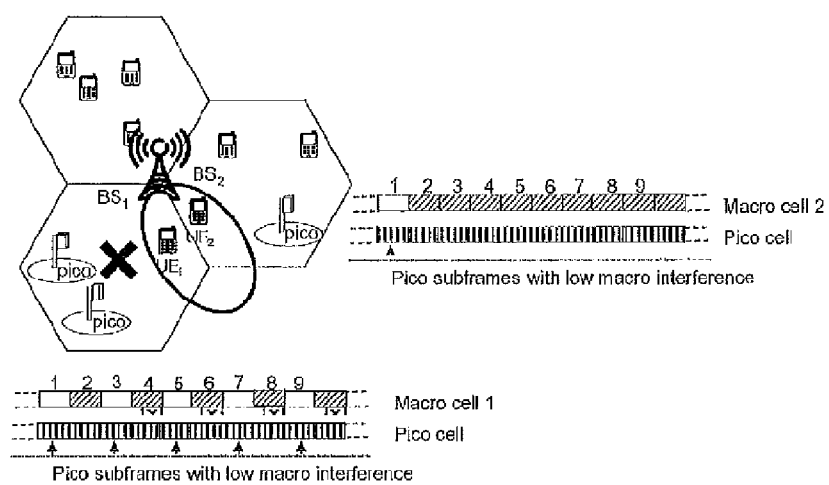
FIG. 7 illustrates an example set of cells for demonstrating embodiments of the present invention.

Embodiments of the invention will be described with reference to FIG. 7. FIG. 7 shows a macro site with 3 sectors, each of which is its own macro cell ($BS_1$ to $BS_3$). $BS_1$ and $BS_2$ each have pico cells (labelled "pico") within their coverage area. The following description will assume that $BS_1$ has an ABS scheduled every second subframe (starting with the first, i.e. 1, 3, 5, 7, 9) and $BS_2$ has an ABS scheduled on subframe 1. The configuration of the ABS subframes is for illustration only, and in a real case would be determined (for example) by the traffic load on the pico cells to be protected. However, the present invention requires that the configuration of protected subframes in $BS_1$ and $BS_2$ is not identical.

Note that FIG. 7 shows a situation where a single site contains 3 eNodeBs, each of which defines a cell. The invention is also applicable to the case where the neighbouring cells are generated by eNodeBs that are not collocated on a site, so long as the resulting cells mutually interfere and/or have partly overlapping coverage areas.

$UE_1$ and $UE_2$ are located near the cell border between $BS_1$ and $BS_2$. $UE_1$ has $BS_1$ as its home cell, and $UE_2$ has $BS_2$ as its home cell. It can therefore be seen that neither UE can receive or transmit on subframe 1 (as both $BS_1$ and $BS_2$ have ABS scheduled), and that each can transmit and receive from $BS_2$ without interference on subframes 3, 5, 7 and 9 (where only $BS_1$ has ABS scheduled). Where reference is made to $BS_1$ and $BS_2$ in the following description, the skilled person will appreciate that this applies equally to any pair of cells, where at least the home cell of the UE in question makes use of ICIC.

In a first embodiment, a first eNodeB is configured with ABS. When scheduling a UE in ABS subframes, the eNodeB causes the PDSCH to be transmitted from a secondary eNodeB that defines an alternative cell or sector, instead of transmitting from the first eNodeB. This alternative cell or sector will generally have an adjacent or slightly overlapping coverage area to the first eNodeB.

In a further embodiment, the network determines whether the UE is near the cell edge or sector border between the coverage areas of the first and second eNodeBs, and only those UEs near the cell edge or sector border have their PDSCH transmissions moved to the second eNodeB. For example, $UE_1$ in FIG. 7 (where $BS_1$ is the cell of the first eNodeB, and $BS_2$ is the cell of the second eNodeB).

In a further embodiment, BS₂ transmits the PDSCH to UE₁ in a subframe where BS₁ uses ABS, and BS₂ has no restrictions (i.e. 3, 5, 7, 9). Therefore, full transmission power may be used by BS₂, without interference from BS₁. This embodiment allows the PDSCH to be scheduled and received by UE₁ in all subframes, not only the non-ABS subframes in the first cell. This leads to an increased throughput for UEs near the cell edge or sector border. Furthermore, during the ABS subframes for the first cell, user performance for UE₁ is increased, as there is no interference from the transmissions of BS₁, increasing the SINR of the transmissions from BS₂.

In a further embodiment, the control signalling for UE₁ may also be dynamically moved from BS₁ to BS₂ when BS₁ has an ABS scheduled. In this embodiment, EPDCCH is used for scheduling the PDSCH, and both the EPDCCH and the PDSCH are scheduled from BS₂ during the ABS subframes of BS₁.

In a further embodiment, the UE₁ may be handed over completely to the BS₂. In this embodiment, the BS₂ schedules the UE₁ during frames in which the BS₁ has scheduled an ABS. Although BS₂ is not the strongest server for UE₁ (e.g. due to lower RSRP, or higher path length), since UE₁ is only scheduled on subframes where BS₁ has scheduled an ABS, the SINR may still be sufficiently high for transmission. In fact, the SINR for BS₂ on subframes where BS₁ has an ABS may be higher than the SINR for BS₁ on subframes where BS₂ is transmitting.

One option to implement this embodiment is to consider it as a cell range expansion for the macro cell BS₂ (similar to the cell range expansion for pico cells described in the background). Therefore, an RSRP offset may be applied to the handover logic for those cells located near the BS₁-BS₂ border. RSRP measurements may be based on the CSI-RS (as suggested for Rel-12 LTE). In this case, the RSRP measured would take into account the ABS patterns.

One application of this embodiment is for load balancing. If BS₁ is overloaded, it may hand over UEs to the adjacent BS₂ in order to more equally distribute the load over the network. Unlike other load balancing applications, interference is avoided so long as the UEs are scheduled on ABSs of BS₁.

In a further embodiment, TM10 may be used to transmit to UE₁ from BS₂ during the protected subframes 3, 5, 7, and 9 without executing a handover. In this embodiment, UE₁ may achieve the best data rate at all times, as it can be connected to BS₁ during subframes 2, 4, 6, 8, 10, (where both BS₁ and BS₂ are transmitting, but BS₁ has the higher SINR) and BS₂ during subframes 3, 5, 7, and 9 (where only BS₂ is transmitting). This embodiment requires fast (e.g. fibre) backhaul between the cells, which is trivial to provide in the case where the eNodeBs are located on the same site. The UE is always served by BS₁, regardless of which of BS₁ and BS₂ the PDSCH comes from.

In an extension of this embodiment, the PQI bits in DCI format 2D are used to indicate the cell switching. For instance, during ABS subframes in the serving cell the PQI bits are "01", indicating that the PDSCH should be received from the neighbouring cell, and during none ABS subframes, the PQI bits are "00", indicating that the PDSCH should be received from the serving cell.

This embodiment may be used for load balancing on a shorter timescale, allowing the serving cell to balance out spikes in the load. It also allows greater flexibility of scheduling of cell-edge UEs, as they may be scheduled on a mix of ABS and non-ABS subframes.

Figure 8:
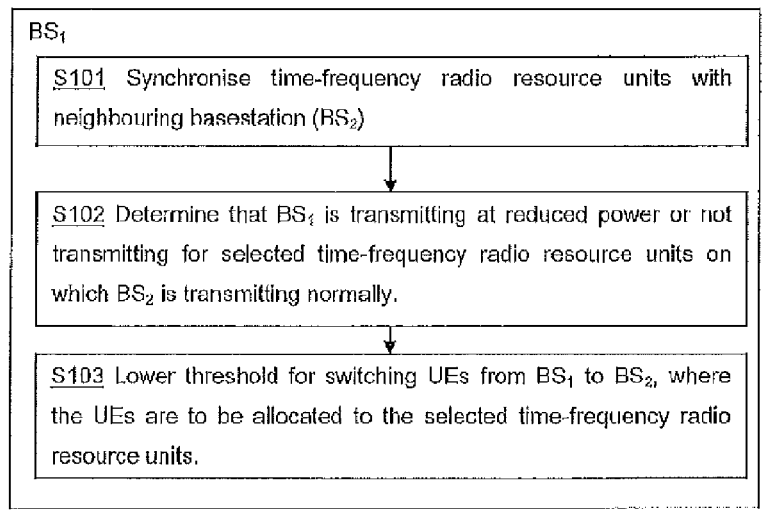
FIG. 8 is a flowchart of a method according to an embodiment.

FIG. 8 is a flowchart showing a method according to one embodiment. The method is shown as performed in BS₁. BS₁ synchronises time-frequency radio resource units (e.g. subframes in LTE) with BS₂ S101. BS₁ then determines that BS₁ intends to transmit at reduced power, or not transmit, on selected time-frequency radio resource units for which BS₂ intends to transmit normally S102. BS₁ then lowers a threshold (e.g. a SINR ratio threshold, or a signal strength ratio threshold) for switching UEs from BS₁ to BS₂, where the UEs are to be allocated to the selected time-frequency radio resource units S103.

Figure 9:
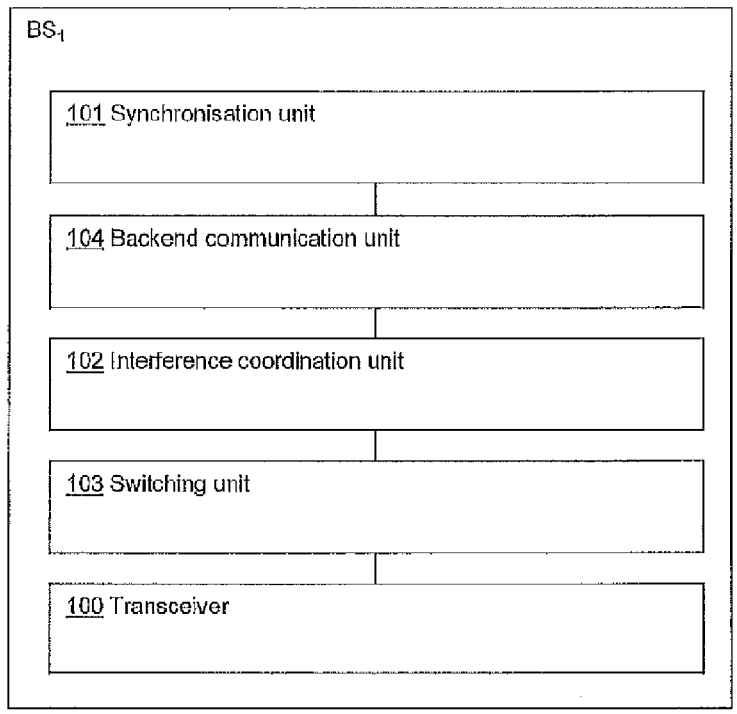
FIG. 9 is a block diagram of a basestation according to an embodiment.

FIG. 9 is a block diagram illustrating a basestation/eNodeB (e.g. BS₁). Only components which perform new functions in this embodiment are shown. BS₁ comprises a transceiver 100 for communicating with UEs in the coverage area. BS₁ further comprises a synchronisation unit 101, an interference coordination unit 102, and a switching unit 103. The synchronisation unit 101 is configured to synchronise the physical radio resource time-frequency radio resource units provided by the BS₁ with those provided by BS₂. The interference coordination unit 102 is configured to determine that BS₁ intends to transmit at reduced power for, or not transmit on, one or more given time-frequency radio resource units selected from the set of available time-frequency radio resource units and to determine that the BS₂ intends to transmit normally on the given time-frequency radio resource unit(s). The switching unit 103 is configured to, as a result of the determination, lower a threshold for switching of UEs from BS₁ to BS₂ where the UEs are to be allocated to the one or more given time-frequency radio resource units of BS₂ following switching. BS₁ may comprise a backend communication unit 104 for communicating with other basestations (e.g. to synchronise subframes and/or send and receive notifications of time-frequency resource units on which the basestations intend not to transmit).

Figure 10:
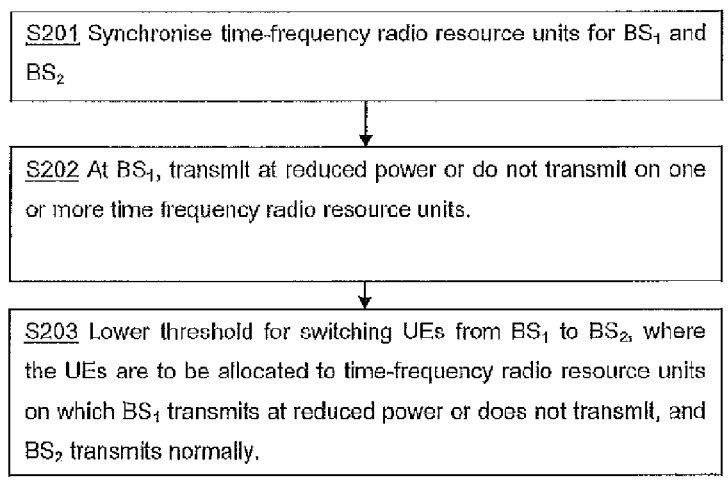
FIG. 10 is a flowchart of a method according to a further embodiment.

FIG. 10 is a flowchart showing a method according to a further embodiment. Time frequency radio resource units are synchronised between BS₁ and BS₂ S201. BS₁ transmits at reduced power or does not transmit on one or more time-frequency radio resource units S202. The threshold for switching UEs from BS₁ to BS₂ is lowered, where the UEs are to be allocated to time-frequency radio resource units on which BS₁ transmits at reduced power or does not transmit, and BS₂ transmits normally S203.

Although the invention has been described in terms of the embodiments set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method in a cellular radio network, the method comprising, at a first basestation:
   synchronising physical radio resource time-frequency radio resource units for the first basestation and a second, neighbouring basestation;
   determining that the first basestation intends to transmit at reduced power for, or not transmit on, one or more given time-frequency radio resource units selected from the set of available time-frequency radio resource units and determining that the second basestation intends to transmit normally on the given time-frequency radio resource unit(s); and as a result of the determination, lowering a threshold for switching of user equipment (UE) from the first to the second base station, where the UEs are to be allocated to the one or more given time-frequency radio resource units of the second basestation following switching.

2. The method according to claim 1, and comprising, at the first basestation:

sending a first notification that the first basestation intends to transmit at reduced power for, or not transmit on, the given time-frequency radio resource unit(s) selected from the set of available time-frequency radio resource units;

receiving a second notification that the second basestation intends to transmit at reduced power for, or not transmit on, one or more further given time-frequency radio resource units selected from the set of available time-frequency radio resource units;

wherein the step of determining that the second basestation is transmitting normally on the given time-frequency radio resource unit(s) comprises receiving the second notification.

3. The method according to claim 1, wherein switching UEs from the first to the second basestation comprises transmitting a shared data channel PDSCH from the second basestation to the UEs, and does not comprise transmitting either a physical downlink control channel, PDCCH, or an enhanced control channel, EPDCCH, from the second basestation to the UEs.

4. The method according to claim 1, wherein switching UEs from the first to the second basestation comprises handing over the UEs from the first to the second basestations.

5. The method according to claim 1, wherein the UEs are to be additionally allocated to time-frequency radio resource units of the first basestation other than the given time-frequency radio resource unit(s).

6. The method according to claim 5 wherein the allocation is performed using LTE transmission mode.

7. An apparatus configured to operate as a first basestation for use in a cellular network, the apparatus comprising:

a transceiver for communicating with user equipments within a coverage area; and a processor configured to:

synchronise the physical radio resource time-frequency radio resource units provided by the first basestation with those provided by a second, neighbouring basestation;

determine that the first basestation intends to transmit at reduced power for, or not transmit on, one or more given time-frequency radio resource units selected from the set of available time-frequency radio resource units and to determine that the second basestation intends to transmit normally on the given time-frequency radio resource unit(s); and, as a result of the determination, lower a threshold for switching of user equipment, UEs, from the first to the second base station where the UEs are to be allocated to the one or more given time-frequency radio resource units of the second basestation following switching.

8. The apparatus according to claim 7, and comprising:

the processor is further configured to send a first notification that the first basestation intends to transmit at reduced power for, or not transmit on, the given time-frequency radio resource unit(s) selected from the set of available time-frequency radio resource units and to receive a second notification that the second basestation intends to transmit at reduced power for, or not transmit on, one or more further given time-frequency radio resource units selected from the set of available time-frequency radio resource units;

wherein the interference coordination unit determines that the second basestation intends to transmit normally on the given time-frequency radio resource unit(s) using the second notification.

9. The apparatus according to claim 7, wherein the processor is additionally configured to, following switching of the UEs, allocate the UEs to time-frequency radio resource units of the first basestation other than the given time-frequency radio resource unit(s).

10. The apparatus according to claim 9, wherein the processor is further configured to perform the allocation using LTE transmission mode.

11. A method in a cellular radio network, the method comprising:

synchronising physical radio resource time-frequency radio resource units for first and second neighbouring basestations;

at the first basestation, transmitting at reduced power or not transmitting on one or more time-frequency radio resource units selected from a set of available time-frequency radio resource units;

at the second basestation, transmitting normally on one or more time-frequency radio resource units selected from a set of available time-frequency radio resource units;

lowering a threshold for switching of user equipment, UEs, from the first to the second basestation, where, following switching, the UEs are to be allocated to time-frequency radio resource units on which the first basestation transmits at reduced power or does not transmit, and on which the second basestation transmits normally.

12. The method according to claim 11, wherein the step of determining comprises, at the first basestation:

sending a notification to the second basestation that the first basestation intends to transmit at reduced power for, or not transmit on, the given time-frequency radio resource unit(s) selected from the set of available time-frequency radio resource units;

receiving a notification from the second basestation that the second basestation intends to transmit at reduced power for, or not transmit on, one or more further given time-frequency radio resource units selected from the set of available time-frequency radio resource units.

13. The method according to claim 11, wherein switching UEs from the first to the second basestation comprises transmitting a shared data channel PDSCH from the second basestation to the UEs, and does not comprise transmitting either a physical downlink control channel, PDCCH, or an enhanced control channel, EPDCCH, from the second basestation to the UEs.

14. The method according to claim 11, wherein switching UEs from the first to the second basestation comprises handing over the UEs from the first to the second basestation.

15. The method according to claim 11, wherein the UEs are to be additionally allocated to time-frequency radio resource units of the first basestation other than the given time-frequency radio resource unit(s).

16. The method according to claim 15 wherein the allocation is performed using LTE transmission mode.

17. A non-transitory computer readable medium having stored thereon computer readable code which, when run on a first basestation, causes the first basestation to carry out a method comprising:
- synchronising physical radio resource time-frequency radio resource units for the first basestation and a second, neighbouring basestation;
- determining that the first basestation intends to transmit at reduced power for, or not transmit on, one or more given time-frequency radio resource units selected from the set of available time-frequency radio resource units and determining that the second basestation intends to transmit normally on the given time-frequency radio resource unit(s); and
- as a result of the determination, lowering a threshold for switching of user equipment (UE) from the first to the second base station, where the UEs are to be allocated to the one or more given time-frequency radio resource units of the second basestation following switching.

* * * * *